United States Patent [19]

Rice, II et al.

[11] Patent Number: 5,569,515

[45] Date of Patent: Oct. 29, 1996

[54] PRINTABLE LINERLESS LABEL AND METHOD FOR MAKING SAME

[75] Inventors: David K. Rice, II, Sanborn; Joseph W. Langan, Cheektowaga, both of N.Y.

[73] Assignee: Moore Business Forms, Inc., Grand Island, N.Y.

[21] Appl. No.: 304,239

[22] Filed: Sep. 12, 1994

[51] Int. Cl.⁶ .................................................. C09J 7/02
[52] U.S. Cl. .................... 428/40.5; 156/153; 156/155; 156/344; 428/220; 428/336; 428/339; 428/350; 428/354; 428/41.3
[58] Field of Search ........................... 428/40, 336, 339, 428/350, 352, 220, 354; 156/153, 155, 344

[56] References Cited

U.S. PATENT DOCUMENTS

| | | |
|---|---|---|
| 1,769,627 | 7/1930 | Fischer . |
| 1,800,194 | 4/1931 | Fischer . |
| 2,078,172 | 4/1937 | Abrams et al. . |
| 2,156,083 | 4/1939 | Dalton . |
| 2,170,654 | 8/1939 | Dalton . |
| 2,233,090 | 2/1941 | Asnes et al. . |
| 2,277,287 | 3/1942 | Beckman ................................. 428/355 |
| 2,462,977 | 3/1949 | Kitchin et al. . |
| 2,569,540 | 10/1951 | Selby . |
| 2,653,885 | 9/1953 | Harper . |
| 2,862,613 | 12/1958 | Klemka et al. . |
| 3,235,396 | 2/1966 | Haberlin . |
| 3,257,228 | 6/1966 | Reed ....................................... 428/355 |
| 3,331,729 | 7/1967 | Danielson et al. . |
| 3,379,562 | 4/1968 | Freeman . |
| 3,531,316 | 9/1970 | Sternasty . |
| 3,916,046 | 10/1975 | Youngberg . |
| 3,924,728 | 12/1975 | Brown et al. . |
| 3,967,031 | 6/1976 | Lambert . |
| 4,054,697 | 10/1977 | Reed et al. . |
| 4,093,772 | 6/1978 | Taylor et al. . |
| 4,406,912 | 9/1983 | Downing . |
| 4,759,816 | 7/1988 | Kasper .................................... 156/235 |
| 4,783,354 | 11/1988 | Fagan . |
| 4,925,715 | 5/1990 | Sato . |
| 4,978,415 | 12/1990 | Jones . |
| 5,292,713 | 3/1994 | Stenzel et al. . |

FOREIGN PATENT DOCUMENTS

3225023A1  2/1983  Germany .

OTHER PUBLICATIONS

PCT/US95/12434 Search Report dated Mar. 4, 1996.

*Primary Examiner*—Jenna Davis
*Attorney, Agent, or Firm*—Finnegan Henderson Farabow Garrett & Dunner

[57] ABSTRACT

A linerless pressure sensitive adhesive label comprising a substrate, a pressure sensitive adhesive layer coated onto at least a portion of one side of the substrate, and a continuous protective layer of polyethylene or amide wax substantially overcoating the pressure sensitive adhesive, thereby masking the tackiness of the substrate. Also included is a method of making a linerless pressure sensitive adhesive label comprising the steps of applying a pressure sensitive adhesive to one side of a substrate, and applying a continuous polyethylene or amide wax protective layer substantially over the pressure sensitive adhesive, thereby masking the tackiness of the substrate. Also disclosed is a method of using the linerless pressure sensitive adhesive label comprising the steps of at least partially removing the protective layer to thereby expose the pressure sensitive adhesive and subsequently affixing the label to a surface.

16 Claims, No Drawings

PRINTABLE LINERLESS LABEL AND METHOD FOR MAKING SAME

BACKGROUND OF THE INVENTION

The present invention relates to pressure sensitive adhesive materials, more particularly to pressure sensitive adhesive linerless labels.

Typical linerless labels are disclosed in U.S. Pat. Nos. 5,292,713 and 4,978,415, and copending applications Ser. Nos. 07/912,851 filed Jul. 13, 1992, 07/907,511 filed Jul. 1, 1992, 07/982,699 filed Nov. 30, 1992, and 08/078,918 filed Jun. 2, 1993, the disclosures of which are each hereby incorporated by reference herein.

Linerless label constructions are typically manufactured by applying a permanent, removable or repositionable pressure sensitive adhesive onto one side of a paper or synthetic continuous substrate or web and applying a release coating to the opposite side of the substrate. The resultant article is then wound upon itself to form a roll. The presence of a release coating on the side of the substrate opposite the adhesive allows the article to be rolled up and then subsequently unrolled, without the adhesive sticking to the substrate. The adhesive sticking to the substrate can prevent the substrate from unrolling. Linerless labels obviate the need for a separate release sheet or liner that must be stripped from the adhesive layer and discarded prior to applying the adhesive substrate to the intended surface. Such liners are inconvenient and often constitute an environmental problem.

However, linerless labels known in the art suffer from several disadvantages. For example, for many applications, it is desirable to print variable indicia on the side of the substrate opposite the adhesive, by means such as ink jet, thermal transfer, flexographic or lithographic. Such applications include for example, shipping, warehouse, and inventory forms and related industrial application forms. But, the presence of a release coating on the side of the substrate opposite the adhesive hinders the ability to apply printed material to the substrate. The surface energy of the release coating prevents wax based toners, inks, and coatings from adhering. Presently, most inks, including ribbon based inks, toners, and coatings, are wax based. The release face of a linerless label has little or no porosity to allow either ink to absorb or toner to become anchored. With conventional linerless labels, the printing can be wiped off or smeared upon contact with other surfaces. Thus, such a product is not compatible with impact or non-impact printers.

Additionally, prior art labels suffer from the disadvantage that the release coating, which is usually glossy in appearance, interferes with bar code scanners.

The prior art has used various materials to overcoat an adhesive layer to deaden or destroy the tackiness properties of the adhesive. The adhesive property is not masked but rather is rendered non-tacky until the adhesive is reactivated by, for example, solvent or water. The use of solvent in the workplace creates hazards such as fumes, which must be vented, and flammability and disposal problems. With water soluble blockers, long term storage, prolonged handling, and exposure to the elements create additional care concerns. Furthermore, the user of the water reactivated label must apply water by manual or other means directly to the label substrate prior to using. This is a messy and time consuming operation. The application of water soaked labels leads to dripping in the area of application creating additional work hazards from the accumulation of moisture on the floor.

SUMMARY OF THE INVENTION

Accordingly, the present invention is directed to a linerless pressure sensitive adhesive label that substantially obviates one or more of the problems due to limitations and disadvantages of the related art.

To achieve the advantages and in accordance with the purpose of the invention, as embodied and broadly described herein, the invention includes in one embodiment a linerless pressure sensitive adhesive label. This label includes a substrate, a pressure sensitive adhesive layer coated onto at least a portion of one side of the substrate, and a continuous protective layer of polyethylene or amide wax substantially overcoating the pressure sensitive adhesive. This continuous protective layer masks the tackiness of the substrate.

The linerless pressure sensitive adhesive label is preferably capable of being printed on the side of the substrate opposite the adhesive layer. The side of the substrate opposite the adhesive layer is preferably receptive to an ink or toner. Preferably, the side of the substrate opposite the adhesive layer does not contain a release coating.

In another aspect, the invention includes a method of making a linerless pressure sensitive adhesive label. This method includes the steps of applying a pressure sensitive adhesive to one side of a substrate, and applying a continuous polyethylene or amide wax protective layer substantially over the pressure sensitive adhesive. This masks the tackiness of the substrate.

A further aspect of the invention relates to a method of producing a printable linerless label. This method involves providing a continuous web of substrate material and applying an adhesive to at least a portion of one side of that substrate material. A continuous layer of polyethylene or amide wax is applied over the adhesive to render the adhesive substantially non-tacky. Printing can be carried out on the side of the substrate material opposite the adhesive. The substrate is then wound onto a roll.

The continuous protective layer can be disturbed or broken, and thus removed, prior to applying the label to a surface. Accordingly, in yet another aspect the invention relates to a method of using a linerless pressure sensitive adhesive label. This method includes the steps of at least partially removing the protective layer to thereby expose the pressure sensitive adhesive and subsequently affixing the label to a surface.

It is to be understood that both the foregoing general description and the following detailed description are exemplary and explanatory only and are not restrictive of the invention, as claimed.

Additional advantages of the invention will be set forth in part in the description which follows, and in part will be obvious from the description, or may be learned by practice of the invention. The advantages of the invention will be realized and attained by means of the elements and combinations particularly pointed out in the appended claims.

DETAILED DESCRIPTION OF THE INVENTION

In accordance with the invention, as embodied and broadly described herein, a linerless pressure sensitive adhesive label is provided. The label includes a substrate, a pressure sensitive adhesive layer coated onto at least a portion of one side of the substrate, and a continuous protective layer of polyethylene or amide wax substantially overcoating the pressure sensitive adhesive. The continuous protective layer masks the tackiness of the substrate.

In accordance with this invention, the substrate can be any of those typically used in the label or tape art. Typical substrates include, for example, paper or synthetic continuous webs, such as PVC, vinyl, polyester, "MYLAR," polyethylene, polypropylene, polyolefin and the like.

In accordance with the invention, the pressure sensitive adhesive layer may comprise any pressure sensitive adhesive typically used in the label or tape art. Examples of such pressure sensitive adhesives include, but are not limited to, rubber, acrylic, latex, and water soluble adhesives. Preferably, the adhesive is water dispersible so that it can be recycled.

The continuous protective layer of this invention is preferably a thin continuous coating of polyethylene or an amide wax. These materials are capable of forming a thin film over the adhesive preventing the surface from being tacky. Polyethylene coatings that can be used in accordance with the invention include, for example, polyethylene AC 6-A, available from Allied Chemical, Polywax 2000 from Bareco, Hoechst Wax RE 520 from American Hoechst, and Shamrock Wax S-395 from Shamrock Chemical. The amide waxes that can be used in accordance with the invention, include, for example, stearamides (such as Kemamide S available. from Humko of Memphis, Tenn.), oleamides (such as Kemamide O available from Humko), behenamides (such as Kemamide B available from Humko), stearyl stearamides (such as Kemamide S-180 available from Humko), erucyl erucamides (such as Kemamide E-221 from Humko), and ethylene-bis-stearamides (such as Kemamide W-40 from Humko).

The protective coating is preferably from about 0.5 to about 2.5 microns in thickness, more preferably from about 0.8 to about 1.2 microns thickness, most preferably about 1 micron in thickness.

The linerless pressure sensitive adhesive label may be overcoated, fully or partially, with printing. The printing is preferably on the side of the substrate opposite the adhesive layer. The printing can comprise, for example, an ink or a toner or other decorative means.

The linerless pressure sensitive adhesive label may contain a tie coat disposed between and adhered to both the substrate and the adhesive-layer. The tie coat aids in the securing of the adhesive to the substrate so that the release does not pull off the adhesive. In addition, the tie coat helps to secure the adhesive to the substrate during the removal of the protective coating. Typical tie coats include, for example, silica, calcium carbonate, zinc stearate, starch, polyvinyl alcohol, ethylene vinyl acetate, vinyl acetate, and acrylic emulsions.

The linerless pressure sensitive adhesive label, because of the presence of the continuous protective layer, does not have to be overcoated with a release coating on the side of the substrate opposite the adhesive layer. The continuous protective layer acts to prevent the adhesive from sticking to the substrate when the label is rolled up.

The present invention temporarily masks the adhesive properties of the labels, and then at a later time unmasks the adhesive by removing the masking means. All the while, the adhesive remains active so that if a portion of the coating is removed, the tackiness of the adhesive is revealed.

In another aspect, the invention includes a method of making a linerless pressure sensitive adhesive label. This method includes the steps of applying a pressure sensitive adhesive by known means to one side of a substrate, and applying a continuous polyethylene or amide wax protective layer substantially over the pressure sensitive adhesive. This masks the tackiness of the substrate. The adhesive can partially or fully overcoat the substrate. The protective layer is preferably a continuous coating or layer.

By "substantially overcoating" it is meant that the protective layer is coated over enough of the adhesive to render the adhesive substantially non-tacky so that the label can be readily rolled and unrolled. The label thus can be but does not have to be coated with a release coating on the substrate face opposite to the adhesive face. The polyethylene or an amide wax is typically applied as a liquid dispersion.

Specifically, the linerless label of the invention may be produced by passing a linerless label stock with an adhesive applied thereto through a coating station that places down the overcoating to mask the adhesive. The coating may be applied by, for example, roll gravure, reverse roll gravure, spraying, hot melt, extrusion, flexographic or lithographic means. The coated label is preferably advanced and, if necessary, subjected to, for example, a drying, chilling, or heating step to cure the overcoating. After the overcoating is cured, the label may be wound onto a roll for distribution.

Printing can be applied to the substrate side opposite the adhesive. The printing on the substrate is preferably performed by conventional flexographic methods. This is similar to a conventional letter press, except that flexible plates, such as plastic or rubber, are used for the printing. Additionally, the label can be subsequently wound up upon itself onto a roll.

The labels of the instant invention can be produced in roll, fanfold or cut-sheet form.

In yet another aspect, the invention relates to a method of using a linerless pressure sensitive adhesive label, which includes the steps of at least partially removing the protective layer to thereby expose the pressure sensitive adhesive and subsequently affixing the label to a surface. The removal of the protective coating can be by a mechanical, chemical or electrochemical means. Specifically, the protective coating can be removed by, for example, U.V. light, ultrasound, corona discharge, or knurled roller.

It will be apparent to those skilled in the art that various modifications and variations can be made to the present invention and in construction of this invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A label comprising a substrate, a pressure sensitive adhesive layer coated onto at least a portion of one side of said substrate, and a continuous protective layer of polyethylene or amide wax substantially overcoating the pressure sensitive adhesive layer, said protective layer having a thickness ranging from about 0.5 to about 2.5 microns, thereby forming a linerless pressure sensitive adhesive label that is substantially non-tacky.

2. The linerless pressure sensitive adhesive label of claim 1, wherein the side of the substrate opposite the adhesive layer is capable of being printed thereon.

3. The linerless pressure sensitive adhesive label of claim 2, wherein the side of the substrate opposite the adhesive layer is receptive to an ink or toner.

4. The linerless pressure sensitive adhesive label of claim 1, wherein the side of the substrate opposite the adhesive layer does not contain a release coating.

5. The linerless pressure sensitive adhesive label of claim 1, wherein the protective layer is polyethylene.

6. The linerless pressure sensitive adhesive label of claim 1, wherein the protective layer is an amide wax.

7. The linerless pressure sensitive adhesive label of claim 1, wherein the protective layer ranges from about 0.8 to about 1.2 microns in thickness.

8. The linerless pressure sensitive adhesive label of claim 1, wherein the substrate is paper.

9. The linerless pressure sensitive adhesive label of claim 1, wherein a tie coat layer is disposed between the substrate and the pressure sensitive adhesive layer.

10. The linerless pressure sensitive adhesive label of claim 1, wherein the adhesive is water dispersible.

11. A method of making a label comprising the steps of applying a pressure sensitive adhesive to one side of a substrate, and applying a continuous polyethylene or amide wax protective layer substantially over the pressure sensitive adhesive, said protective layer having a thickness ranging from about 0.5 to about 2.5 microns, thereby forming a linerless pressure sensitive adhesive label that is substantially non-tacky.

12. The method of claim 11, further comprising printing on the substrate side opposite the adhesive.

13. The method of claim 11, wherein the label is subsequently wound onto a roll.

14. The method of claim 11, wherein the label is not coated with a release coating on the side of the substrate opposite the adhesive layer.

15. The method of claim 11, further comprising the step of curing said protective layer.

16. The method of claim 11, wherein the protective layer ranges from about 0.8 to about 1.2 microns in thickness.

* * * * *